(12) United States Patent
Shattil

(10) Patent No.: US 11,778,019 B2
(45) Date of Patent: *Oct. 3, 2023

(54) CONTENT DELIVERY IN WIRELESS WIDE AREA NETWORKS

(71) Applicant: Tybalt, LLC, Boulder, CO (US)

(72) Inventor: Steve J Shattil, Cheyenne, WY (US)

(73) Assignee: Tybalt, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,738

(22) Filed: May 10, 2022

(65) Prior Publication Data

US 2022/0272149 A1    Aug. 25, 2022

Related U.S. Application Data

(63) Continuation of application No. 16/934,708, filed on Jul. 21, 2020, now Pat. No. 11,330,046, which is a (Continued)

(51) Int. Cl.
*H04L 29/08* (2006.01)
*H04L 67/101* (2022.01)
(Continued)

(52) U.S. Cl.
CPC .......... *H04L 67/101* (2013.01); *H04L 41/147* (2013.01); *H04L 45/70* (2013.01);
(Continued)

(58) Field of Classification Search
CPC ... H04L 65/80; H04L 43/0882; H04L 67/289; H04L 67/26; H04L 67/322;
(Continued)

(56) References Cited

U.S. PATENT DOCUMENTS 6,138,156 A    10/2000 Fletcher
6,484,212 B1    11/2002 Markowitz et al.
(Continued)

OTHER PUBLICATIONS

S.T. Shah, et al.; "SC-FDMA-based resource allocation and power control scheme for D2D communication using LTE-A uplink resource"; EURASIP Journal on Wireless Communications and Networking (2015) 2015:137.
(Continued)

*Primary Examiner* — Jung Liu
(74) *Attorney, Agent, or Firm* — Steven J Shattil

(57) ABSTRACT

A base station or content delivery server in a wireless network is configured to receive wireless network topology information from each of a plurality of wireless user devices. The wireless network topology information indicates which wireless user devices are within radio communication range of each other. The base station or content delivery server is configured to respond to a request for content from a first wireless user device by using the wireless network topology information for selecting a second wireless user device that has the content and is within radio communication range of the first wireless user device. The base station or content delivery server can be configured to forward the request to the second wireless user device, send a resource identifier to the first wireless user device that identifies the second wireless user device, and/or transmit a radio resource allocation to the first wireless user device to create a peer-to-peer link with the second wireless user device.

20 Claims, 10 Drawing Sheets

Related U.S. Application Data continuation of application No. 16/569,033, filed on Sep. 12, 2019, now Pat. No. 10,735,503, which is a continuation of application No. 16/030,852, filed on Jul. 9, 2018, now Pat. No. 10,419,533, which is a continuation of application No. 15/152,028, filed on May 11, 2016, now Pat. No. 10,021,175, which is a continuation of application No. 15/076,000, filed on Mar. 21, 2016, now Pat. No. 9,806,953, which is a continuation of application No. 13/647,686, filed on Oct. 9, 2012, now Pat. No. 9,325,805, which is a continuation-in-part of application No. 13/036,778, filed on Feb. 28, 2011, now abandoned, and a continuation-in-part of application No. 13/036,812, filed on Feb. 28, 2011, now abandoned, and a continuation-in-part of application No. 13/036,171, filed on Feb. 28, 2011, now abandoned.

(60) Provisional application No. 61/550,048, filed on Oct. 21, 2011, provisional application No. 61/308,997, filed on Mar. 1, 2010.

(51) Int. Cl.
| | |
|---|---|
| *H04L 67/01* | (2022.01) |
| *H04L 67/63* | (2022.01) |
| *H04L 41/147* | (2022.01) |
| *H04L 45/00* | (2022.01) |
| *H04L 67/1014* | (2022.01) |
| *H04L 67/1021* | (2022.01) |
| *H04L 67/1023* | (2022.01) |
| *H04W 24/02* | (2009.01) |
| *H04W 40/12* | (2009.01) |
| *H04W 40/20* | (2009.01) |
| *H04W 72/0453* | (2023.01) |
| *H04L 41/12* | (2022.01) |
| *H04W 28/16* | (2009.01) |
| *H04W 40/02* | (2009.01) |
| *H04W 84/18* | (2009.01) |

(52) U.S. Cl.
CPC .......... *H04L 67/01* (2022.05); *H04L 67/1014* (2013.01); *H04L 67/1021* (2013.01); *H04L 67/1023* (2013.01); *H04L 67/63* (2022.05); *H04W 24/02* (2013.01); *H04W 40/12* (2013.01); *H04W 40/20* (2013.01); *H04W 72/0453* (2013.01); *H04L 41/12* (2013.01); *H04W 28/16* (2013.01); *H04W 40/02* (2013.01); *H04W 84/18* (2013.01); *Y02D 30/70* (2020.08)

(58) Field of Classification Search
CPC ... H04L 67/2842; H04L 69/329; H04L 69/40; H04L 67/2814; H04L 67/06; H04L 45/22; H04L 29/06; H04L 45/00; H04L 45/26; H04L 5/0007; H04L 27/2636; H04L 27/2646; H04L 27/2666; H04L 27/2698
See application file for complete search history.

(56) References Cited

U.S. PATENT DOCUMENTS

| | | | |
|---|---|---|---|
| 6,529,146 B1 | 3/2003 | Kowalski et al. | |
| 6,842,487 B1* | 1/2005 | Larsson | H04L 27/2602 |
| | | | 455/10 |
| 6,848,004 B1 | 1/2005 | Chang et al. | |
| 7,069,014 B1 | 6/2006 | Thenthiruperai | |
| 7,079,176 B1 | 7/2006 | Freeman et al. | |
| 7,133,905 B2 | 11/2006 | Dilley et al. | |
| 7,313,604 B2 | 12/2007 | Wood et al. | |
| 7,448,063 B2 | 11/2008 | Freeman et al. | |
| 7,565,415 B1 | 7/2009 | Markowitz et al. | |
| 7,634,795 B2 | 12/2009 | Dureau | |
| 7,640,320 B2 | 12/2009 | Madison et al. | |
| 7,725,073 B2 | 5/2010 | Anderson et al. | |
| 7,730,216 B1* | 6/2010 | Issa | H04L 67/104 |
| | | | 709/214 |
| 7,783,777 B1* | 8/2010 | Pabla | G06F 16/1834 |
| | | | 709/239 |
| 7,822,428 B1 | 10/2010 | Morris et al. | |
| 7,831,726 B2 | 11/2010 | Megeid | |
| 8,024,340 B2 | 9/2011 | Kageyama et al. | |
| 8,588,803 B2 | 11/2013 | Hakola et al. | |
| 9,736,779 B2* | 8/2017 | Min | H04W 52/0235 |
| 9,801,133 B2* | 10/2017 | Min | H04L 5/0007 |
| 9,806,953 B2 | 10/2017 | Shattil | |
| 9,974,023 B2* | 5/2018 | Min | H04W 52/0229 |
| 10,021,175 B2 | 7/2018 | Shattil | |
| 10,237,826 B2* | 3/2019 | Azizi | H04L 5/0053 |
| 10,313,860 B2* | 6/2019 | Montemurro | H04W 36/18 |
| 10,327,196 B2 | 6/2019 | Yerrabommanahalli et al. | |
| 2001/0049741 A1 | 12/2001 | Skene et al. | |
| 2002/0010798 A1 | 1/2002 | Ben-Shaul et al. | |
| 2002/0083148 A1 | 6/2002 | Shaw et al. | |
| 2002/0092026 A1 | 7/2002 | Janniello et al. | |
| 2002/0099790 A1 | 7/2002 | Mosher et al. | |
| 2002/0103928 A1 | 8/2002 | Singal et al. | |
| 2002/0138291 A1 | 9/2002 | Vaidyanathan | |
| 2002/0150123 A1 | 10/2002 | Ro | |
| 2002/0161928 A1 | 10/2002 | Ndili | |
| 2002/0163882 A1 | 11/2002 | Bornstein et al. | |
| 2002/0194596 A1 | 12/2002 | Srivastava | |
| 2003/0020671 A1 | 1/2003 | Santoro et al. | |
| 2003/0025832 A1 | 2/2003 | Swart et al. | |
| 2003/0061206 A1 | 3/2003 | Qian | |
| 2003/0099235 A1 | 5/2003 | Shin et al. | |
| 2003/0156543 A1 | 8/2003 | Sahinoglu et al. | |
| 2003/0200336 A1 | 10/2003 | Pal et al. | |
| 2003/0223732 A1 | 12/2003 | Lin et al. | |
| 2004/0128680 A1 | 7/2004 | Karaoguz | |
| 2004/0148393 A1 | 7/2004 | Breiter et al. | |
| 2004/0192375 A1 | 9/2004 | Cho et al. | |
| 2004/0205162 A1 | 10/2004 | Parikh | |
| 2004/0266339 A1* | 12/2004 | Larsson | H04W 88/02 |
| | | | 455/7 |
| 2005/0027851 A1 | 2/2005 | McKeown et al. | |
| 2005/0071496 A1 | 3/2005 | Singal et al. | |
| 2005/0083848 A1 | 4/2005 | Shao et al. | |
| 2005/0091665 A1 | 4/2005 | Baird et al. | |
| 2006/0015574 A1 | 1/2006 | Seed et al. | |
| 2006/0018279 A1* | 1/2006 | Agrawal | H04W 88/10 |
| | | | 370/330 |
| 2006/0088063 A1 | 4/2006 | Hartung et al. | |
| 2006/0120244 A1 | 6/2006 | Miyauchi et al. | |
| 2006/0143327 A1 | 6/2006 | Hsieh et al. | |
| 2006/0146831 A1 | 7/2006 | Argyropoulos et al. | |
| 2006/0200842 A1 | 9/2006 | Chapman et al. | |
| 2006/0239371 A1 | 10/2006 | Dyer et al. | |
| 2006/0288370 A1 | 12/2006 | Rothschild | |
| 2006/0288395 A1 | 12/2006 | DiLorenzo | |
| 2007/0061393 A1 | 3/2007 | Moore | |
| 2007/0067480 A1 | 3/2007 | Beek et al. | |
| 2007/0092018 A1 | 4/2007 | Fonseka et al. | |
| 2007/0104215 A1 | 5/2007 | Wang et al. | |
| 2007/0154167 A1 | 7/2007 | Ando et al. | |
| 2007/0157240 A1 | 7/2007 | Walker | |
| 2007/0174463 A1 | 7/2007 | Seed et al. | |
| 2007/0201705 A1 | 8/2007 | Dorogusker et al. | |
| 2007/0226365 A1 | 9/2007 | Hildreth et al. | |
| 2007/0264985 A1 | 11/2007 | Kapur et al. | |
| 2008/0008089 A1 | 1/2008 | Bornstein et al. | |
| 2008/0075033 A1 | 3/2008 | Shattil | |
| 2008/0095121 A1 | 4/2008 | Shattil | |
| 2008/0095259 A1 | 4/2008 | Dyer et al. | |
| 2008/0146256 A1 | 6/2008 | Hawkins et al. | |
| 2008/0155062 A1 | 6/2008 | Rabold et al. | |
| 2008/0162156 A1 | 7/2008 | Fein et al. | |
| 2008/0201748 A1 | 8/2008 | Hasek et al. | |

(56) References Cited

U.S. PATENT DOCUMENTS

| | | |
|---|---|---|
| 2008/0205270 A1 | 8/2008 | Kasheff et al. |
| 2008/0216145 A1 | 9/2008 | Barton et al. |
| 2008/0219158 A1 | 9/2008 | Mukraj et al. |
| 2008/0222281 A1 | 9/2008 | Dilley et al. |
| 2008/0279112 A1 | 11/2008 | Schryer et al. |
| 2008/0281946 A1 | 11/2008 | Swildens et al. |
| 2008/0303794 A1 | 12/2008 | Bolt et al. |
| 2008/0320565 A1 | 12/2008 | Buch et al. |
| 2009/0049479 A1 | 2/2009 | Green et al. |
| 2009/0100068 A1 | 4/2009 | Gauba et al. |
| 2009/0106288 A1 | 4/2009 | Yang et al. |
| 2009/0113024 A1 | 4/2009 | Verma et al. |
| 2009/0113253 A1 | 4/2009 | Wang et al. |
| 2009/0135944 A1 | 5/2009 | Dyer et al. |
| 2009/0140977 A1 | 6/2009 | Morris |
| 2009/0150518 A1 | 6/2009 | Lewin et al. |
| 2009/0164653 A1 | 6/2009 | Mandyam et al. |
| 2009/0199120 A1 | 8/2009 | Baxter et al. |
| 2009/0282160 A1 | 11/2009 | Wang et al. |
| 2009/0284476 A1 | 11/2009 | Bull et al. |
| 2009/0310686 A1 | 12/2009 | Kee |
| 2009/0316627 A1 | 12/2009 | Fonseka et al. |
| 2010/0023693 A1 | 1/2010 | Dilley et al. |
| 2010/0036949 A1 | 2/2010 | Li et al. |
| 2010/0036954 A1 | 2/2010 | Sakata et al. |
| 2010/0070925 A1 | 3/2010 | Einaudi et al. |
| 2010/0095332 A1 | 4/2010 | Gran et al. |
| 2010/0120372 A1 | 5/2010 | Li et al. |
| 2010/0153802 A1 | 6/2010 | Van deMerwe et al. |
| 2010/0169778 A1 | 7/2010 | Mundy et al. |
| 2010/0198977 A1 | 8/2010 | Shetty et al. |
| 2010/0238188 A1 | 9/2010 | Miceli |
| 2010/0274819 A1 | 10/2010 | Lewin et al. |
| 2010/0299522 A1* | 11/2010 | Khambete ............ H04L 63/061 713/168 |
| 2011/0107374 A1 | 5/2011 | Roberts |
| 2011/0116376 A1 | 5/2011 | Pacella et al. |
| 2011/0131520 A1 | 6/2011 | Al-Shaykh et al. |
| 2011/0197237 A1 | 8/2011 | Turner |
| 2011/0213879 A1 | 9/2011 | King et al. |
| 2011/0214059 A1 | 9/2011 | King et al. |
| 2011/0214061 A1 | 9/2011 | King et al. |
| 2012/0005371 A1 | 1/2012 | Ravindran et al. |
| 2012/0106428 A1 | 5/2012 | Schlicht et al. |
| 2012/0106504 A1 | 5/2012 | Klatt et al. |
| 2012/0215850 A1* | 8/2012 | Kiesel ................. H04L 67/1063 709/204 |
| 2012/0236801 A1 | 9/2012 | Krishnaswamy et al. |
| 2013/0329626 A1 | 12/2013 | Sohn et al. |
| 2014/0025811 A1 | 1/2014 | Gagliardi et al. |
| 2014/0206377 A1 | 7/2014 | Priotti |
| 2016/0255140 A1* | 9/2016 | Shattil ..................... H04L 67/63 709/219 |
| 2016/0374020 A1* | 12/2016 | Azizi ................... H04W 52/028 |
| 2016/0381636 A1* | 12/2016 | Park ..................... H04L 27/0002 370/311 |
| 2018/0077641 A1* | 3/2018 | Yang ................. H04W 52/0229 |
| 2018/0084499 A1* | 3/2018 | Qi ..................... H04W 52/0235 |
| 2018/0132227 A1 | 5/2018 | Ghosh et al. |
| 2018/0160465 A1* | 6/2018 | Chiang ............... H04L 67/1082 |
| 2018/0176053 A1* | 6/2018 | Park ..................... H04L 27/2613 |
| 2018/0332533 A1* | 11/2018 | Bhattad ............. H04W 52/0216 |

OTHER PUBLICATIONS

"Defendant Asustek Compupter Inc.'s Answer to First Amended Complaint"; U.S. District Court for the Eastern District of Texas, Civil Action No. 2:22-CV-00066; Document 30, Filed Mar. 7, 2023.

* cited by examiner

CONTENT DELIVERY IN WIRELESS WIDE AREA NETWORKS

CROSS-REFERENCE TO RELATED APPLICATIONS

This application is a is Continuation of U.S. patent application Ser. No. 16/934,708, filed on Jul. 21, 2020, now U.S. Pat. No. 11,330,046, which is a Continuation of U.S. patent application Ser. No. 16/569,033, filed on Sep. 12, 2019, now U.S. Pat. No. 10,735,503, which is a Continuation of U.S. patent application Ser. No. 16/030,852 filed Jul. 9, 2018, now U.S. Pat. No. 10,419,533, which is a Continuation of U.S. patent application Ser. No. 15/152,028, filed May 11, 2016, now U.S. Pat. No. 10,021,175, which is a Continuation of U.S. patent application Ser. No. 15/076,000, filed Mar. 21, 2016, now U.S. Pat. No. 9,806,953, which is a Continuation of U.S. patent application Ser. No. 13/647,686, filed Oct. 9, 2012, now U.S. Pat. No. 9,325,805, which claims priority to Provisional Appl. No. 61/550,048, filed Oct. 21, 2011; and which is a Continuation-in-Part of U.S. patent application Ser. No. 13/036,778, filed Feb. 28, 2011, which claims priority to Provisional Appl. No. 61/308,997, filed Mar. 1, 2010; a Continuation-in-Part of U.S. patent application Ser. No. 13/036,171, filed Feb. 28, 2011, which claims priority to Provisional Appl. No. 61/308,997, filed Mar. 1, 2010; and a Continuation-in-Part of U.S. patent application Ser. No. 13/036,812, filed Feb. 28, 2011, which claims priority to Provisional Appl. No. 61/308,997, filed Mar. 1, 2010.

BACKGROUND

1. Field of the Invention

The present invention relates generally to content delivery networks (CDNs), and more particularly, to media distribution in wireless communication networks.

2. Introduction

Limited storage of mobile devices is driving cloud services in which data and software are stored on the network. However, in wireless networks, limited wireless bandwidth, variable reliability of the communication channels, and mobility of the client devices discourages off-site data storage and produces significant challenges to media distribution.

The trend in 4G cellular is to make wireless client devices part of the network infrastructure by enabling them to communicate with each other and cooperate. For example, Cooperative MIMO, cooperative diversity, and ad-hoc peer-to-peer networking are being incorporated into the 4G wireless standards. These technologies expand coverage, extend range, and greatly increase bandwidth with minimal cost to wireless service providers. These technologies also provide a significant change to the network topology, as the conventional server-client topology is overlaid with some clients functioning as gateways and routers for other clients. As a result, the nature of media distribution needs to adapt to these new network topologies, especially when client devices generate content or relay content to other client devices.

For conventional media distribution over the Internet, providers of web content and applications typically deliver content from multiple servers at diverse locations in order to sustain a good end-user experience under high traffic loads. In a wireless network, mobile client devices may function as part of the CDN infrastructure. In some cases, mobile devices may be configured to function as "surrogate" origin servers (e.g., Edge Servers). In some cases, mobile client devices may generate content for localized data and software services, such as maps, weather, and traffic.

The extension of a CDN to a wireless ad-hoc network introduces challenges, including, among others, how to guarantee fault-tolerance as the location, availability, and link quality of each mobile terminal may be continuously changing; how to control how requests from end-users are distributed to each Edge Server; and how to guarantee high performance for end-users as network conditions change.

Accordingly, content delivery mechanisms need to adapt to highly variable network topologies and operating conditions in order to provide reliable media and data services. These and other needs in the field may be addressed by aspects of the present invention.

SUMMARY

In accordance with an aspect of the present invention, methods, systems, and software are provided for routing media in a CDN. In wireless wide area networks (WWANs), aspects of the invention employ network layer protocols that exploit special properties of the wireless physical layer. In peer-to-peer networks, WWAN nodes may be configured to perform edge server functionality, such as to reduce WWAN congestion.

A method of selecting an edge-server set from a plurality of nodes comprises determining the network topology state in a CDN. The network topology state may comprise bit-rate estimates for communication links based on network congestion and channel quality. A plurality of candidate edge-server sets is selected, and a performance metric for each set is calculated. At least one of the candidate edge server sets is selected based on the performance metric.

In one aspect of the invention, an iterative method is employed for selecting the candidate edge-server sets. In each iteration, a new candidate set is generated by appending, deleting, or changing at least one node in a previous set. The network topology state may be updated for the new set. A performance metric is calculated for the new set, comprising a benefit minus a cost associated with implementing the new set. At the completion of the iterations, a best set is determined.

In accordance with one aspect of the invention, the performance metric is calculated from a backpressure routing algorithm.

In accordance with another aspect of the invention, the iterative process of selecting and evaluating candidate edge server sets employs a trellis exploration algorithm. A trellis may be constructed using a number of candidate edge servers. A fitness function is derived from a mathematical relationship quantifying costs and network performance improvements corresponding to each edge server. The best edge server sets correspond to paths having optimal path metrics (i.e., branch metrics) derived from the fitness function. Multiple iterations through the trellis may be performed to refine the selection of edge servers.

In another aspect of the invention, a method for processing a request by a client for an object comprises determining if the requesting client is a wireless device in a wireless network; determining if another client on the wireless network has the requested object; determining if the requesting client can communicatively couple to the other client; and directing the request to the other client. The method may be performed by an edge server, a parent server, an origin server, or another network device configured to intercept requests. In some aspects, the method may be performed by requesting client.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific aspects thereof, which are illustrated in the appended drawings. Understanding that these drawings depict only typical aspects of the invention and are not therefore to be considered to be limiting of its scope, aspects of the invention will be described and explained with additional specificity and detail through the use of the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Figure 1:
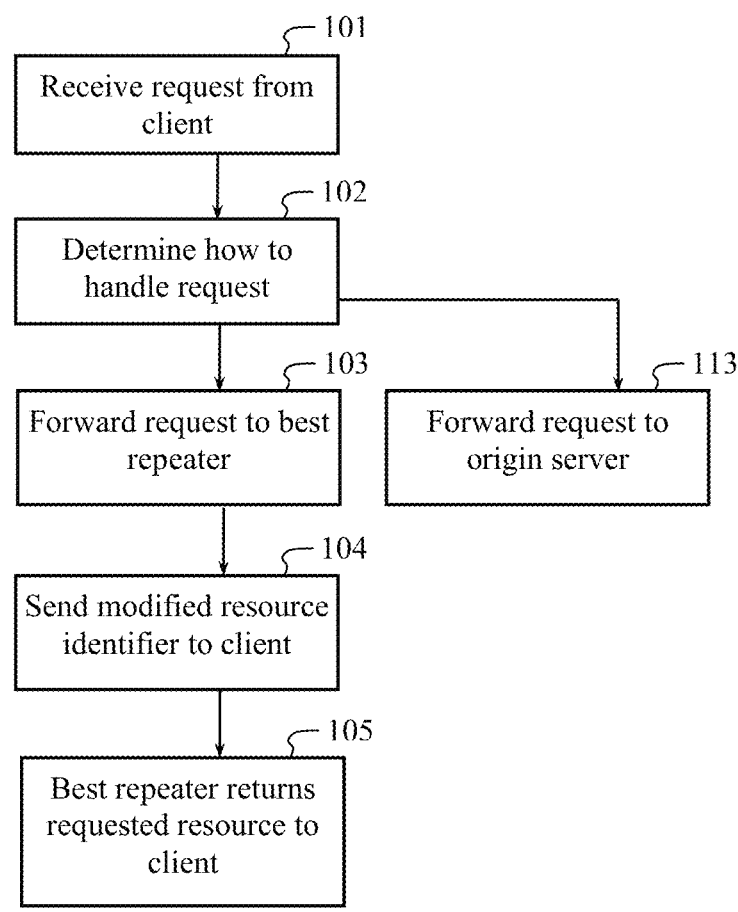
FIG. 1 is a flow diagram depicting a method for routing requests for network resources in a CDN.

In accordance with an aspect of the invention, FIG. 1 is a flow diagram depicting a method for routing requests for network resources in a CDN. The CDN comprises a network of computers containing copies of data placed at various nodes (i.e. edge servers, which are also referred to as proxy caches, content delivery nodes, or repeaters) of the network. Data content types include web objects, downloadable objects (e.g., media files, software, documents), applications, streaming media, and database queries. Other data content types may also be cached and distributed in the CDN. By caching data, a CDN can increase access bandwidth and redundancy while reducing access latency. For example, the capacity sum of strategically placed edge servers can exceed the network backbone capacity.

In FIG. 1, an origin server receives a client request for a particular resource 101. The request includes a resource identifier for the particular resource. Sometimes the resource identifier includes an indication of the origin server. A mechanism known as a reflector, which may be co-located with the origin server, determines how to handle the request from the client 102. For example, the reflector may decide whether to reflect the request or to handle it locally. If the reflector decides to handle the request locally, it forwards it to the origin server 113. Otherwise, the reflector determines a "best" repeater to process the request and forwards the request to the selected repeater 103. If the request is reflected, the reflector sends a modified resource identifier to the client 104 that designates the selected repeater. The client requests the resource from the repeater designated in the modified resource identifier, and the repeater responds to the client's request by returning the requested resource to the client 105. If the repeater has a local copy of the resource, it returns that copy. Otherwise, it forwards the request to the origin server or another repeater to obtain the resource. Optionally, the repeater may save a local copy of the resource in order to serve subsequent requests.

Some aspects of the invention provide for determining which nodes are designated as edge servers. Strategically placed edge servers decrease the load on interconnects, public peers, private peers and backbones, increasing network capacity and reducing delivery costs. Some aspects of the invention provide for determining which content is stored on designated edge servers. Further aspects of the invention provide for determining which of the edge servers handle a specific request. Instead of loading all traffic on a backbone or peer link, a CDN can redirect traffic to edge servers. In some aspects of the invention, a client requesting a resource may be directed to request the resource from another client. Thus, a client may perform at least some edge server functions.

Figure 2:
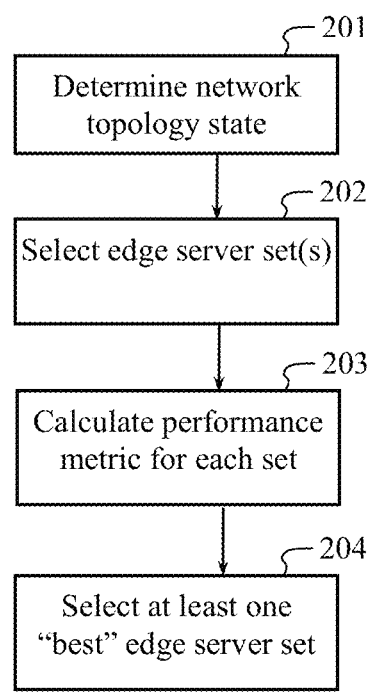
FIG. 2 is a flow diagram depicting a method for selecting a set of edge servers in accordance with an aspect of the invention.

FIG. 2 is a flow diagram depicting a method for selecting a set of edge servers in accordance with an aspect of the invention. The method comprises determining a network topology state 201 for a network of nodes. A plurality of edge-server sets is selected 202 from the set of nodes, and a performance metric for each of the edge-server sets is calculated 203. At least one of the edge-server sets is selected based on the best performance metric(s) 204.

In step 201, the network topology state may comprise bit-rate estimates for communication links based on network congestion, channel bandwidth, communication channel quality, and the like.

The network topology state may also comprise a topology of demand for resources across the network.

As used herein, a network topology is a mapping of the configuration of physical-layer and/or logical connections between nodes. Network topology may include the signal topology of the network. By way of example, a network topology may comprise a mapping of communication channels between the nodes. The network topology indicates which nodes can communicate directly with each other. A graphical mapping of the network topology results in a geometric shape that may be used to describe the physical and/or logical topology of the network.

As used herein, the network topology state is a network topology comprising additional information about data flow between the nodes, such as measured and/or estimated transmission rates, distances between nodes, queue backlogs, latency, signal types, channel estimates, error rates, congestion, link reliability estimates etc.

Since CDNs generally deliver content over TCP connections, the throughput is affected by both latency and packet loss. In order to mitigate both of these effects, CDNs traditionally place servers close to users. Typically, a closer source enables faster, more reliable content delivery. Although network distance is not the only factor that leads to best performance, providing user demand in the network topology state can facilitate selecting and evaluating the edge-server sets and better optimize resource delivery and network loads.

Figure 3:
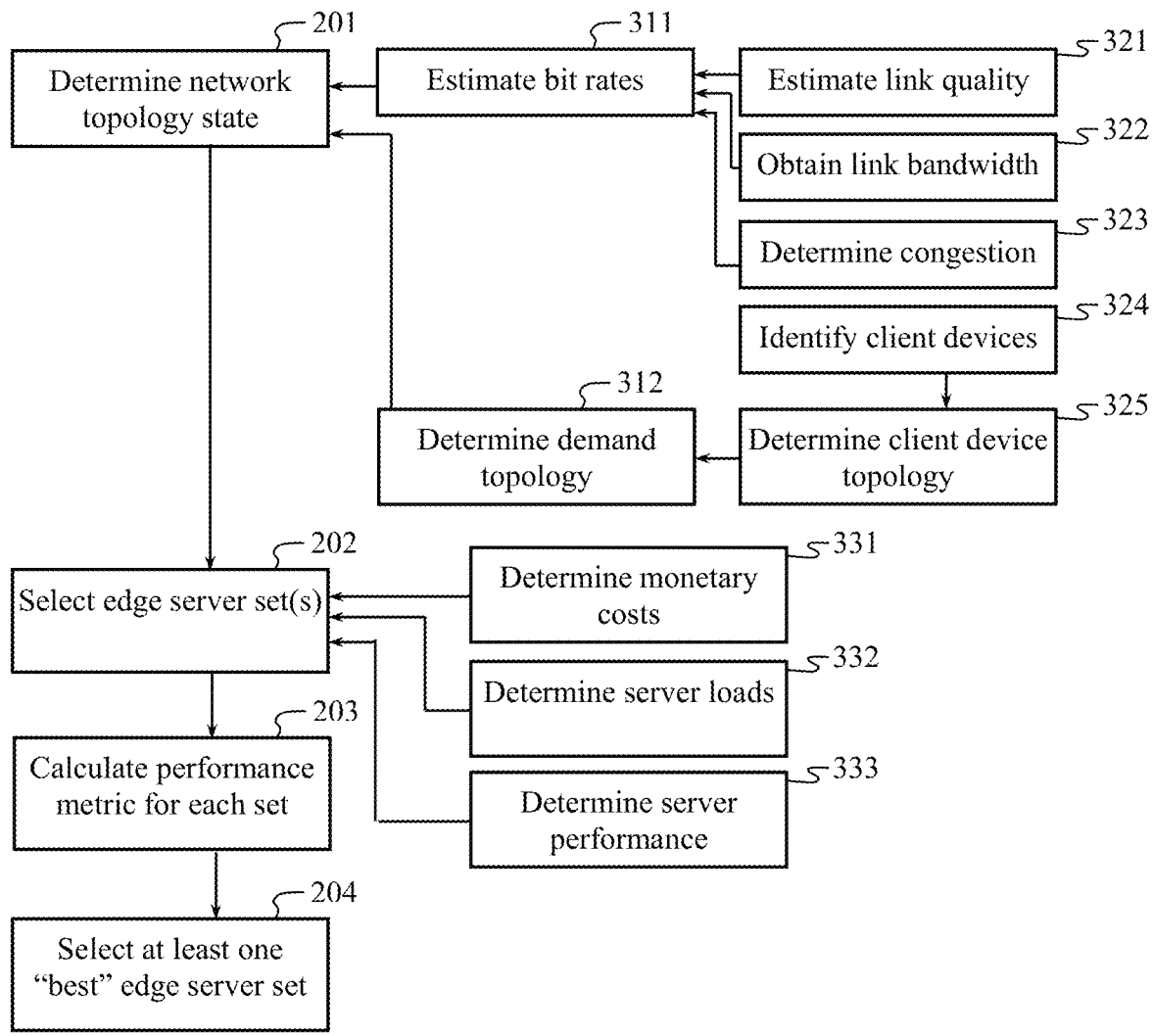
FIG. 3 is a flow diagram that depicts a method for selecting edge servers in accordance with another aspect of the invention.

FIG. 3 is a flow diagram that depicts a method for selecting edge servers in accordance with another aspect of the invention. A step of determining a network topology state 201 for a network of nodes may comprise estimating bit rates 311 for each link in the network. When a path in the network is congested or faulty, data packets sent over that path can get dropped or delayed. In some aspects of the invention, determining the network topology state 201 may comprise acquiring link-delay information and/or requests for retransmission, and then processing that information to estimate the bit rates 311 or achieve some other measure of link performance pertaining to the network topology. In one aspect of the invention, channel modeling may be performed in step 201 for at least some of the links (such as when a link comprises a wireless channel). Since power levels, channel coding, error-correction coding, and symbol constellations can be indicators of channel quality and bit rates, such signaling parameters may be employed in the step of determining the network topology state 201.

In one aspect of the invention, bit-rate estimation 311 may comprise estimating link quality 321, obtaining link bandwidth 322, and/or determining congestion at each node 323. In one aspect of the invention, determining congestion 323 comprises obtaining queue backlog information at each node. In some aspects of the invention, step 201 comprises generating a network topology that is essentially a map indicating connections between nodes. In a wireless network, nodes may listen to communications between each node to determine which nodes it could potentially link to.

A node may broadcast its possible connections (and optionally, link quality estimates of those connections) to facilitate generating the network topology.

In a mobile wireless network, it may be necessary to frequently update the network topology. The step of estimating link quality 321 may comprise measuring channel quality of a wireless channel between nodes in a wireless network. For example, a link quality estimate may comprise SNR, BER, packet error rate, or other direct and/or indirect measurements of at least one wireless channel. The step of obtaining link bandwidth 322 may comprise obtaining link bandwidth(s) allocated by the network and/or measured link bandwidth (e.g., bandwidths actively employed in the link).

Optionally, determining a demand topology for the network 312 may precede step 201.

Determining the network topology state 201 may be part of a process for providing congestion load balancing, such as when multiple communication paths are available to a wireless terminal for network access. The network topology state may comprise estimated achievable bit rates for each link between a given wireless terminal to each available access point. In some aspects, the network topology state may comprise measured bit rates. Thus, any mathematical function, such as fitness function, based on the network topology state may comprise at least one of predicted performance (e.g., bit rates) and measured performance between nodes in the network.

In step 311, the bit rates may comprise a function of congestion information and signal quality information received from network nodes. The network topology state may then be used to select one or more edge servers 202, such as to provide congestion load balancing.

When an edge server set is changed (e.g., a new edge server is added to the edge server set), this typically changes the network configuration that best serves the clients, as the best estimated achievable bit rate for at least some of clients may be improved by reassigning edge servers to those clients. A request from a client for given content is directed to a "best" content delivery node, wherein "best" could mean that the content is delivered quickest to the client. For example, an edge server may be selected if it can deliver content more quickly than an origin server. The edge server may be selected based on its geographical proximity to the requesting client. However, the edge server with the closest proximity does not guarantee the best performance, as network conditions (e.g., congestion, link quality, link bandwidth) can impede that nodes ability to serve content. Other performance metrics may be used to select the best content delivery node. For example, latency (such as may be determined by number of hops in a peer-to-peer network or queue backlogs at the nodes), link bandwidth, link bit-error rates, and/or some regional or global measure of network performance may be employed as a performance metric when assigning edge servers to serve particular clients. In a wireless network, step 202 may comprise selecting one or more of the wireless network nodes to function as edge servers.

The network topology state is continually changing due to network conditions. In a mobile wireless network, the locations of the nodes and clients may change. Thus, in some aspects of the invention, determining the network topology state 201 may comprise an iterative process of re-evaluating and/or updating the network topology state. When a new set of edge servers is selected 202, such as when a new edge server is added to an existing set, a reassignment of edge servers to clients typically changes network congestion. Consequently, changes in network congestion can lead to updates in assignments of edge servers to clients. Thus, an iterative process for determining the network topology state can be effective in handling this feedback condition. A stable network topology state may be produced after a predetermined number of iterations or when some predetermined stability criterion is met.

In another aspect of the invention, determining the network topology state 201 may comprise generating a statistical model of the network topology state. The statistical model may comprise a time-average of network loads, user demands, queue backlogs, bit rates, channel quality, geographical distributions of users, and/or other link-performance data. In some aspects, the statistical model may account for temporal variations in network conditions. For example, network loads and geographical distributions of users typically vary with time and often exhibit predictable patterns that can be incorporated into the statistical model.

In some aspects of the invention, determining the network topology state 201 may comprise determining a device network topology 325 for each of a set of device types. Some devices run specific software that may need to be updated. In one aspect, edge server selection 202 for a patch to a handheld device's operating system may differ from the set of edge servers storing an update to a laptop operating system due to differences in the geographical distributions of handheld devices and laptop devices. For example, handheld devices are most commonly operated on streets and roads, whereas content requests from laptops are more common in commercial and residential areas.

In some aspects, different devices are capable of receiving different types of media. For example, laptops are capable of receiving higher-resolution video than smart phones. Thus, a device network topology may be based on devices having a predetermined set of capabilities. The use and distribution of certain devices can depend on different times of the day and vary from day to day. For example, mobile devices are more densely distributed on metropolitan highways during rush hour. The use of mobile devices during lunch hour and rush hours is typically higher as well. The type of content requested may vary both temporally and geographically. Thus, determining a network topology state may comprise determining a demand topology.

Determining a demand topology 312 may comprise anticipating that certain types of content will be requested from certain geographical locations at certain times. For example, the network will receive a high number of requests for traffic information in the vicinity of metropolitan highways during rush hours. Thus, determining the network topology state can lead to the selection of edge server sets for specific content.

A performance metric is determined 203 for each of the plurality of provisional edge-server sets. The request-routing mechanism in a conventional CDN allocates servers in the content delivery infrastructure to requesting clients in a way that, for web content delivery, minimizes a given client's response time and, for streaming media delivery, provides for the highest quality. Thus, the performance metric may comprise different metrics depending on the type of content being served.

Determining the performance metric 203 may also comprises route selection. A routing service may predict a best path for a data transfer between a source location (e.g., a content provider origin server) and a target location (e.g., a CDN edge server) by analyzing some performance metric common to a set of possible routes. Route selection may also comprise employing intermediate nodes for transferring data packets from one node to another node. Intermediate node selection may be based on network performance data collected over time. Route selection may comprise selecting routes between edge servers (e.g., a CDN edge server and/or nodes in a mobile wireless network performing edge server functionality) and client devices.

The performance metric may comprise link information between given nodes based on ping data (age, loss and latency). Step 203 then computes the best routes. In update mode, step 203 may comprise continually polling the potential routes to rank their performance, and then use the best route to evaluate the associated performance metric.

Costs associated with each route and/or each edge server in the set may be included in the performance metric. For example, the content provider is charged for the amount of storage required on the origin site to store their files. The content provider purchases a fixed amount of storage on the edge servers that is used to store a limited number of files. The content provider is also charged for the bandwidth used to load the files onto the origin site and the bandwidth used to transfer files from the origin servers to the edge servers.

According to some aspects of the invention, the performance metric may depend on various systemic factors. For example, the monetary cost for allocating additional bandwidth on a server may be less expensive if the bandwidth for the server is below the commit level. Thus, aspects of the invention may comprise determining monetary costs 331 associated with candidate edge servers prior to selecting the edge server sets 202. These monetary costs may be used in the evaluation of the performance metric for each set 203.

Network loads typically vary with time of the day and day of the week. Thus, a step of determining which of the candidate edge servers have lower loads 332 during a specific time period may be performed prior to selecting the edge server sets 202. Estimated server loads may be used to in the evaluation of the performance metric for each set 203.

The performance of each server may vary with time. Thus, a step of determining server performance (e.g., bandwidth, latency, and availability) 333 may be performed prior to selecting the edge server sets 202. In wireless networks, step 202 may comprise selecting one or more wireless network nodes to provide edge server functionality, such as caching frequently requested content and/or content that is pertinent to client requests in a node's geographical location. Selection of the nodes 202 may comprise providing for bit-rate estimates based on signal quality and current congestion levels.

In one aspect of the invention, congestion information is obtained in response to probes of each candidate edge server (referred to as active scanning), while in another aspect of the invention, beacon packets containing congestion information from each edge server are used to estimate the achievable bit rate (referred to as passive scanning). The signal-quality information may be used to estimate the bit error rate (BER) of data served by each candidate edge server based on the signal to noise ratio or signal strength of a signal received from each edge server. In one aspect, the packet error rate (PER) is calculated from the BER. The server performance may be used in the evaluation of the performance metric for each set 203.

In accordance with some aspects of the invention, at least one of the sets of edge servers is selected 204 based on a balance of provider costs (e.g., bandwidth costs) and end-user satisfaction (e.g., network latency and packet loss between the server and the client).

Following determination of a best set of edge servers 204, the selected set is implemented in the network (not shown). Since changing the set of edge servers changes congestion load balancing, the steps 201-204 may be repeated as part of an update process. Thus, the network topology for the selected set and candidate edge server sets may be periodically updated. Furthermore, determining network topology 201 may comprise updating assignments of clients to edge servers as network loads change.

Figure 4:
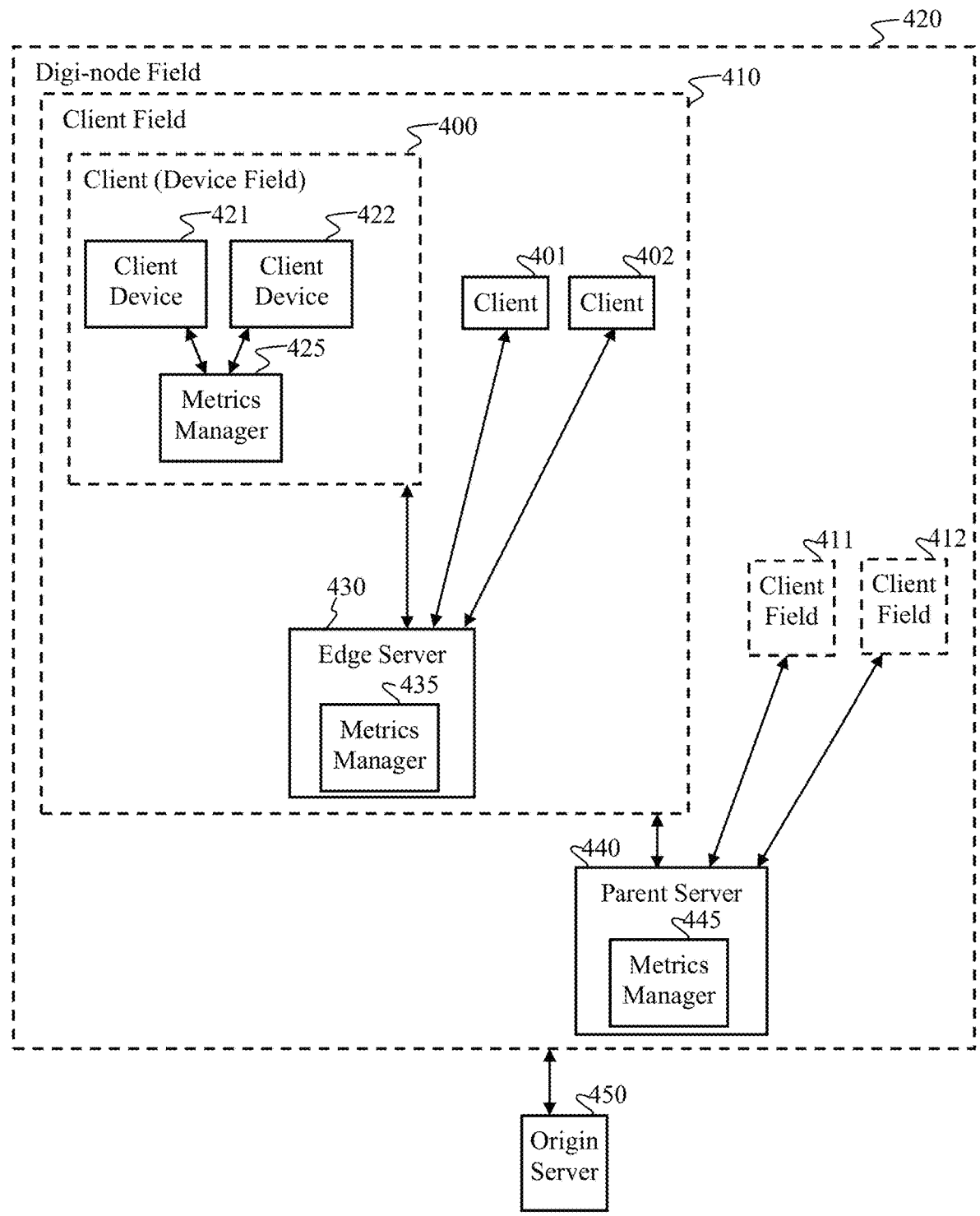
FIG. 4 is a block diagram of a CDN in accordance with one aspect of the invention.

FIG. 4 is a block diagram of a CDN in accordance with one aspect of the invention. A client 400 comprises a device field, which may include one or more client devices, such as client devices 421 and 422 communicatively coupled to the client 400 via a personal area network (PAN). The client 400 comprises a client-side metrics manager 425. In some aspects of the invention, the metrics manager 425 may reside on one or more of the client devices 421 and 422.

The metrics manager 425 collects data from the client devices 421 and 422 and manages client interactions with the CDN. From the CDN's perspective, the client 400 is a router to a sub-network because the PAN is essentially hidden from the CDN. Thus, the metrics manager 425 formulates requests for media that is configured and formatted for the specific client device 400, 421, and/or 422 in the PAN that is selected to present the media. The metrics manager 425 may optionally convey device information that is otherwise hidden from the CDN.

According to one aspect of the invention, the local segment of the CDN that serves the client 400 may comprise a WLAN, a cellular network, a satellite network, or some other wireless network in which it is desirable to conserve bandwidth and/or power resources. Thus, if a destination client device in the PAN (e.g., one of the client devices 421 and 422) has lower bandwidth needs than client 400, bandwidth resources are not wasted by serving the client 400 at its typical resource level. Rather, the metrics manager 425 requests a media stream at a lower bandwidth. In another aspect of the invention, at least one of the client devices 421 or 422 is configurable for presenting media content at a higher bandwidth than is capable of being presented by the client device 400. The metrics manager 425 requests a media stream at the higher bandwidth. The local segment of the CDN may adapt to the request by allocating multiple channels or a high-bandwidth channel to the client 400.

In one aspect of the invention, at least one of the client devices is served by a wireless link, and the metrics manager 425 manages client interactions with the network based on wireless network performance data. For example, the metrics manager 425 may request a media stream bandwidth based on the quality of a communications link serving at least one of the client devices 400-402. The link quality may be indicated by the wireless network performance data. The link quality may be indicated by other factors, such as the amount of data stored in a client device's buffer, or a low-bandwidth status warning from a device in response to detected pixilation or frame slowing of media presented in the client's display. The metrics manager 425 may be responsive to status and/or warning indicators generated by the client devices 400, 421, and 422 for adapting (e.g., formulating) the requests for the media resources.

In one aspect of the invention, a client device may be served by more than one network. For example, a cellular handset may also have WiFi capability. The metrics manager 425 may be configured for conveying network connectivity information to the CDN.

An edge server 430 serves one or more clients, such as clients 400-402. Clients 401 and 402 each comprise one or more client devices (not shown) and a client-side metrics manager (not shown). The edge server 430 comprises a network node metrics manager 435 configured for collecting data from one or more client-side metrics managers (e.g., metrics manager 425) and brokering network resources from the CDN to the clients 400-402. The edge server 430 and the clients 400-402 it serves are part of a client field 410. The client field 410 is managed by the metrics manager 435 for distributing network resources (e.g., media services) to the clients 400-402.

The data employed by the metrics manager 435 may comprise raw and/or processed client-side data. For example, the data may comprise a number of requests for media resources, types of media resources requested, and/or bandwidths of the requested media resources. The data may comprise aggregations of the client-side data, such as the total bandwidth requested. The data may comprise indications of changing network loads (e.g., the number of requests for increased/decreased bandwidth) and/or changes in network performance (e.g., number of acknowledgements, number of requests for retransmission, measured latency, packet error rate, etc.). The metrics manager 435 allocates the network resources from the CDN to the clients 400-402 based, at least in part, on the data collected from the client-side metrics managers 425.

According to one aspect of the invention, the network node metrics manager 435 receives a request from one of the clients 400-402 in the client field 410. The metrics manager 435 may perform a check to determine if a cached copy of the requested object is available at the edge server 430. Where a cached copy of the requested object is available to the edge server 430 (e.g., in a data store coupled to the edge server), the edge server 430 transmits the cached copy of the object to the client. The method may further comprise transmitting the request to a parent server or an origin server if the cached copy is not available at the edge server 430. Alternatively, the metrics manager 435 (or node cloud metrics manager 445) may reassign the client field 410 to a different edge server.

A parent server 440 comprising a node cloud metrics manager 445 is communicatively coupled to a plurality of client fields, such as client fields 410-412. The metrics manager 445 is configured for collecting data from multiple network node metrics managers, such as network node metrics manager 435, for distributing network services between edge servers 430. The parent server 440 and the client fields 410-412 it serves is denoted as a digi-node field 420. The digi-node field 420 is managed by the metrics manager 445 for distributing network services to the edge servers, such as edge server 430.

The data employed by the metrics manager 445 may comprise raw and/or processed data from the network node metrics managers (such as metrics manager 435). The data may comprise a number of requests for media resources, types of media resources requested, and/or bandwidths of the requested media resources. The data may comprise aggregations of the client-side data and/or data from the network node metrics managers. For example, the data may comprise the total bandwidth requested, or the amount of bandwidth requested at each edge server. The data may comprise indications of changing network loads (e.g., the number of requests for increased/decreased bandwidth) and/or changes in network performance (e.g., number of acknowledgements, number of requests for retransmission, measured latency, packet error rate, etc.). The metrics manager 435 distributes the network resources of the CDN between the network nodes (e.g., edge servers) based, at least in part, on the data collected from the metrics managers 435.

The CDN shown and described with respect to FIG. 4 is configured for reducing access latency and network backbone congestion by storing copies of popular resources on edge servers, such as edge servers that are in close proximity to requesting users. However, wireless networks are often employed as the final segment of a CDN. In such systems, it is desirable to optimize the use of wireless network resources, such as bandwidth and power. The introduction of peer-to-peer and cooperative networking technologies improves the management of such resources when implemented in accordance with aspects of the invention.

In accordance with certain aspects of the invention, in a CDN employing wireless communication links to client devices via a wireless wide area network (WWAN), edge server functionality may be located much closer to the clients. For example, frequently requested content may be stored on the WWAN infrastructure, such as on servers operated by WWAN service providers, and/or even on the client devices. Requests for selected resources may be reflected to WWAN servers and/or clients. In some aspects, the WWAN service providers, or even other client devices within a requesting client's local area network may process the requests. When clients form cooperative groups via connections from local area networks and communicate with each other, such as in a peer-to-peer manner, WWAN congestion can be reduced by storing content on the clients.

Figure 5:
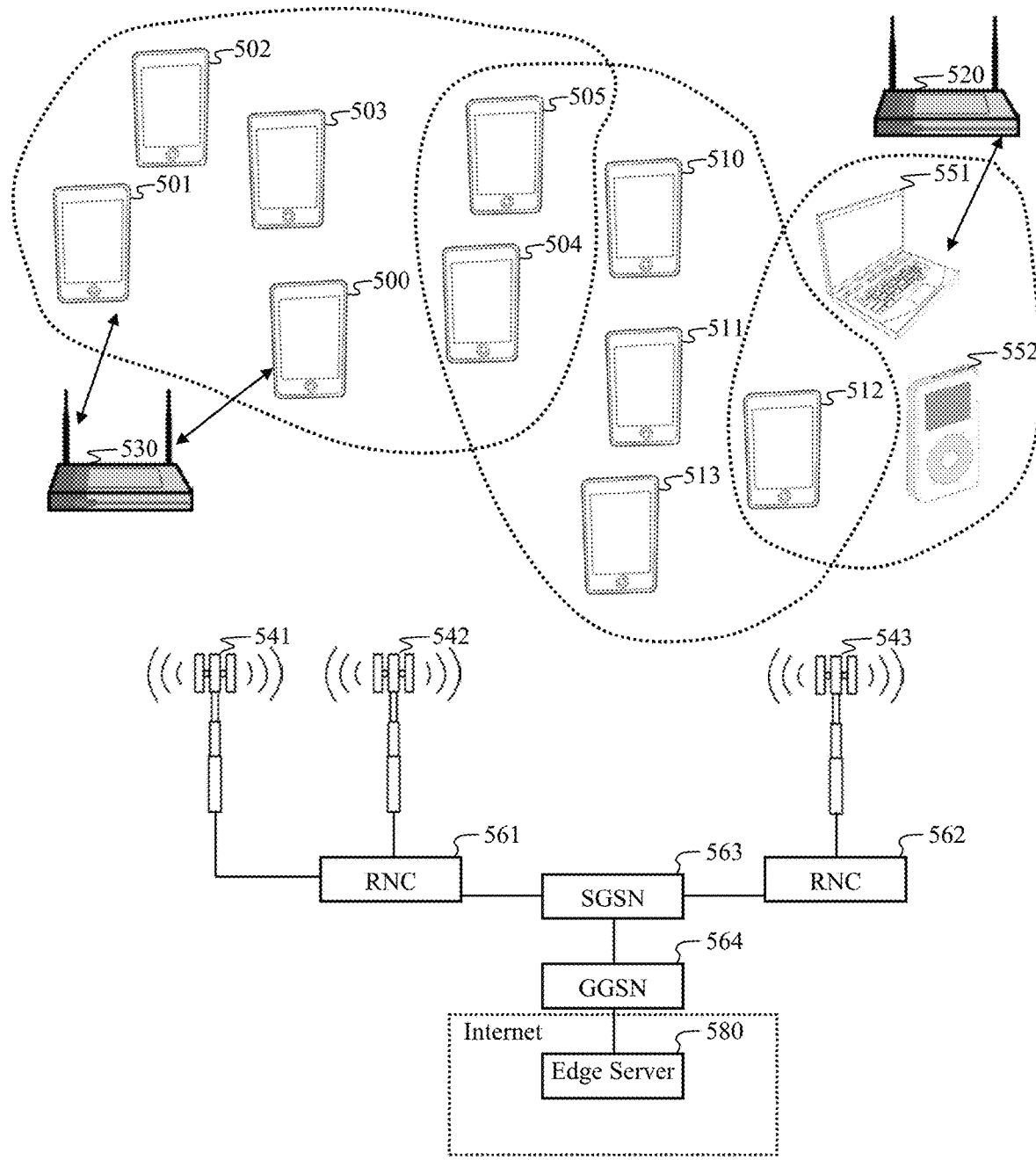
FIG. 5 depicts a network configuration in which aspects of the invention may be implemented.

FIG. 5 depicts a network configuration in which aspects of the invention may be implemented. While the system shown in FIG. 5 comprises a Long Term Evolution (LTE) wireless network, other types of networks that employ Cooperative MIMO, mesh networking, and/or peer-to-peer ad-hoc communications may employ aspects of the invention.

LTE wireless networks, also known as Evolved Universal Terrestrial Radio Access (E-UTRA), are being standardized by the 3rd Generation Partnership Project (3GPP) working groups. LTE is a standard for wireless communication of high-speed data based on GSM/EDGE and UMTS/HSPA network technologies. LTE Advanced is a next-generation mobile communication standard being standardized by 3GPP as a major enhancement to the LTE standard. LTE Advanced includes specifications for Network MIMO and Cooperative MIMO.

Network MIMO is a family of techniques whereby a client in a wireless system is simultaneously served by multiple access points (e.g., base stations) within its radio communication range. By tightly coordinating the transmission and reception of signals at multiple access points, network MIMO effectively reduces inter-cell interference.

Cooperative MIMO is a distributed antenna array processing technique typically employed in wireless mesh networking or wireless ad-hoc networking. In wireless ad-hoc networks, multiple transmit nodes may communicate with multiple receive nodes. To optimize the capacity of ad-hoc channels, MIMO techniques can be applied to multiple links between the transmit and receive node clusters as if the antennas in each cluster were physically connected. Contrasted to multiple antennas residing on a single-user MIMO transceiver, cooperating nodes and their antennas are located in a distributed manner. In order to optimize the capacity of this type of network, techniques to manage distributed radio resources are essential. In aspects of the invention, resource management techniques for Cooperative MIMO may be further configured for content management, such as for load balancing and reducing congestion on WWAN links.

According to some aspects of the invention, distributed computing is employed in a Cooperative-MIMO network to coordinate media distribution. The evolution of distributed processing on multiple computing cores and the evolution of cooperation between mobile antenna systems enhances opportunities to perform cooperative work, such as sharing information storage and data processing, on multiple cores owned by different users. Aspects of the invention provide for brokering of network resources, increasing the availability of information storage and processing for each client device in exchange for helping others, and potentially improving network efficiency (e.g., reducing network congestion and enabling quicker access to content).

The network shown in FIG. 5 comprises WLAN groups of WWAN client devices. For example, WLAN 531 comprises client devices 500-505, which are configured for communicating with a WWAN. Communication paths 571 and 573 denote WWAN connections with a WWAN comprising cellular base stations (or Node Bs, or base transceiver stations) 541 and 542. Base stations 541-543 comprise radio equipment connected to the WWAN that communicates directly with the WWAN client devices 500-505 and 510-513. WLAN 532 includes client devices 510-513 and may optionally include devices 504 and 505, which also reside in WLAN 531. Communication paths 572 and 574 denote WWAN connections with the WWAN.

Radio Network Controllers (RNCs), such as RNCs 561 and 562, are governing elements in the UMTS radio access network that are responsible for controlling Node Bs. For example, RNC 561 performs radio resource management and mobility management functions for base stations 541 and 542. RNC 562 performs radio resource management and mobility management functions for base stations 543. The RNCs 561 and 562 connect to a Serving GPRS Support Node (SGSN) 563 in the Packet Switched Core Network. A Serving GPRS Support Node (SGSN) is responsible for the delivery of data packets from and to the mobile stations within its geographical service area. Its tasks include packet routing and transfer, mobility management (attach/detach and location management), logical link management, and authentication and charging functions. A Gateway GPRS Support Node (GGSN) 564 is responsible for the interworking between the GPRS network and external packet switched networks, such as the Internet and X.25 networks.

From an external network's point of view, the GGSN 564 is a router to a sub-network because the GGSN 564 hides the GPRS infrastructure from the external network. Thus, in a conventional CDN, an edge server 580 does not see the structure of the GPRS network. However, in order to improve GPRS network efficiency, such as reducing congestion on WWAN links, aspects of the invention provide for edge server functionality inside the GPRS network.

In one aspect of the invention, a WWAN client device may function as a network controller for its respective WLAN. For example, client device 500 is the network controller for WLAN 531, and client device 510 is the network controller for WLAN 532. The network controllers 500 and 510 organize the WWAN devices within their respective WLANs to communicate with the WWAN. The WWAN client devices coordinate their WWAN processing functions, and each client device may access the Internet through the GPRS network. The RNC 561 may employ multiple base stations 541 and 542 for communicating with each WWAN device, such as to suppress inter-cell interference via phase-coherent coordination and joint spatial filtering between the base stations 541 and 542.

Some client devices may access the Internet via alternative network connections. For example, client devices 500 and 501 are communicatively coupled to an access point 530 that may provide connectivity to the Internet. The network controller 500 may control data communications via alternative network connections that are available to the WLAN 531.

In some aspects of the invention, a WWAN client device (such as device 512) may comprise a personal area network (PAN) 533 with other devices 551 and 552. The PAN 533 may provide a route to Internet connectivity, such as via access point 520. This network connectivity information may be made available to other devices in the WLAN 532, and such alternative network connections may be utilized by other client devices 510, 511, and 513 in the WLAN 532.

In some aspects of the invention, WWAN client devices in different WLANs may communicate with each other via a different network than the WWAN. For example, one WLAN may communicate directly with another WLAN in a mesh or peer-to-peer manner. In some aspects, information may be communicated from one WLAN 531 to another 532 via access points 530 and 520. In other aspects, WLAN 531 and WLAN 532 may communicate with each other via cooperative beamforming.

Figure 6:
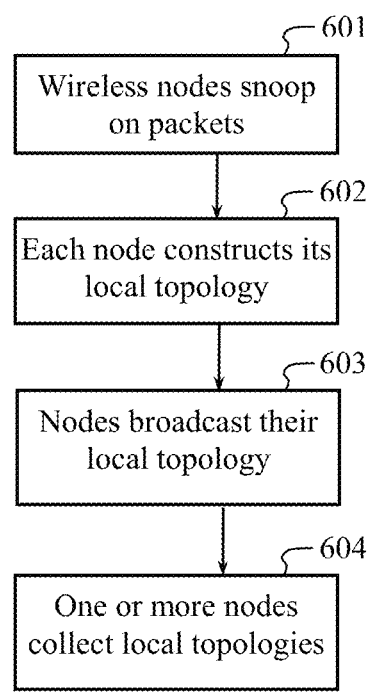
FIG. 6 depicts a method for determining a network topology state in a wireless network in accordance with an aspect of the invention.

In accordance with one aspect of the invention, FIG. 6 depicts a method for determining a network topology state 201 in a wireless network. Nodes in the wireless network snoop on MAC headers of packet transmissions 601 within radio range. Passive scanning, such as packet snooping, enables the nodes to estimate their local topology 602. For example, a node listens to the MAC header to obtain the source address and destination address of the packet. The node listens for the acknowledgement (ACK) from the destination address to determine if the destination node is within communication range. If the ACK is overheard, then the snooping node concludes that the acknowledging node is part of its clique topology. Otherwise, it is in a hidden-node topology with respect to the destination node. The node may process acknowledgement signals, such as measuring the signal strength, to estimate the link quality or potential bit rate. Further information about the other nodes may be obtained from the MAC headers. For example, the OUI and serial number may be compared to a database of OUIs and serial number ranges to identify the manufacturer and device model for each node. Each node broadcasts its local topology 603 so that one or more nodes collecting local topology information 604 can construct a regional network topology state in the wireless network.

Figure 7:
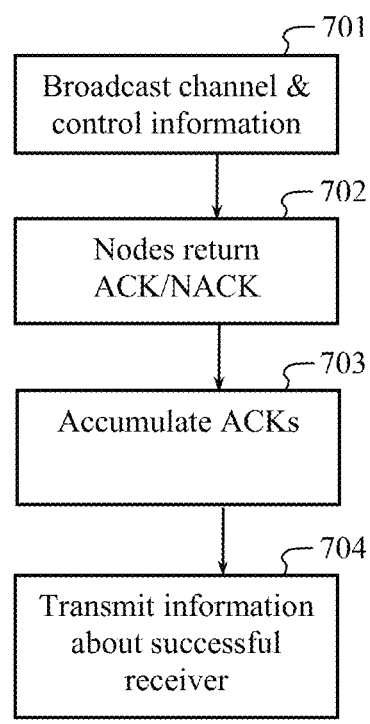
FIG. 7 depicts a method for determining a network topology state in a wireless network in accordance with another aspect of the invention.

FIG. 7 is a flow diagram depicting a method for determining a network topology state 201 in a wireless network in accordance with another aspect of the invention. At the beginning of a timeslot, channel information and any necessary control information is broadcast 701 by a broadcast node in the wireless network. This information may be transmitted over a dedicated control channel, or it may be appended to header of packets transmitted on previous timeslots. Nodes provide an immediate ACK/NACK feedback to the transmitter 702, which informs the transmitter if the packet was successfully received. The absence of an ACK signal is considered to be equivalent to a NACK, as this absence indicates that the receiver node did not detect the transmission. The broadcast node accumulates all of the ACK responses 703 and then transmits a final message that informs the successful receivers of other successful receivers 704. This transmission may include instructions for future packet forwarding. In one aspect of the invention, the successful receivers may respond (not shown) by transmitting addresses and link information of nodes that are hidden from the broadcast node. Information about the successful receivers (and optionally, any hidden receivers) may be used to generate a network topology for the wireless network. Simple estimates of channel quality may be made based on the nodes' feedback, or the nodes may return link-quality information.

In one aspect of the invention, the step of selecting edge-server sets 202 in a wireless network comprises exploiting either or both transmission-side and receiver-side diversity made possible by the Wireless Broadcast Advantage (WBA). An example of WBA is when a first node transmits a signal to a second node, and a third node receives the transmitted information at no additional cost.

A transmission that might be overheard by multiple receiver nodes within range of the transmitter enables a multi-receiver diversity gain, wherein the probability of successful reception by at least one node within the subset of receivers is often much greater than the corresponding success probability of just one receiver alone. Cooperation between the second and third nodes for receiving the transmission provides for receive-side diversity, which results in a performance gain that can be used for a combination of reducing transmit power and increasing data throughput. For example, some form of optimal combining may be performed by the second and third nodes to achieve receiver-diversity gain.

Cooperation between the second and third nodes when rebroadcasting the transmission produces transmit diversity, which can also provide a performance gain. For this reason, the problem of finding the optimal path between an edge server and each requesting client node may be a multi-stage decision-making problem, wherein at each stage, a set of nodes may cooperate to relay the transmission to a selected node.

In one aspect of the invention, solutions to this multi-stage decision-making problem may be estimated using an asymptotically optimal decoding algorithm, such as a trellis-exploration algorithm similar to the Viterbi algorithm. Such algorithms may be employed in steps 202, 203, and/or 204. In one aspect, the minimum-energy cooperative route may be viewed as a sequence of sets of cooperating nodes along with an appropriate allocation of transmission powers. The tradeoff is between spending more energy in each transmission slot to reach a larger set of nodes, and the potential savings in energy in subsequent transmission slots due to cooperation. Accordingly, selecting the candidate edge servers 201 may comprise considering local and/or regional wireless network topologies that provide for cooperative routing, and estimating preliminary performance metrics for how well each edge server can serve requesting clients within its radio range.

In accordance with another aspect of the invention, WWAN nodes that have access to the Internet via alternative networks may be selected as edge servers, and requests for content by WWAN clients may be intercepted within the WWAN and redirected to one of the edge servers that can retrieve the requested content without loading the WWAN.

Figure 10:
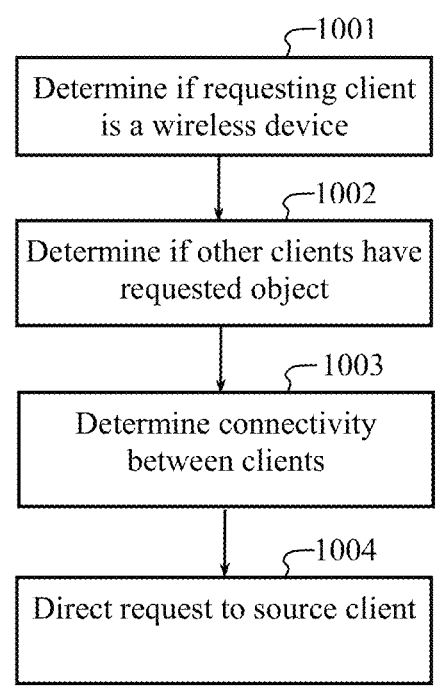
FIG. 10 is a flow diagram depicting a method for routing a request for an object by a requesting client in a wireless network.

FIG. 10 is a flow diagram depicting a method for routing a request for an object by a requesting client in a wireless network. The request may be processed by a conventional CDN edge server, parent server, or origin server. Alternatively, the request may be intercepted, such as by a WWAN controller or by another client device. In some aspects, the requesting client may perform at least one of the steps in the method.

Upon receiving the request, the receiver of the request determines if the requesting client is a wireless device residing on a wireless network 1001. The requesting client may simply identify itself as a wireless device. If the receiver of the request is a wireless network controller, then step 1001 may comprise authenticating the client's identity. If the receiver of the request is a server on the CDN, then a predetermined client identifier in the request may be cross-referenced with a client database to determine if the client resides on a wireless network. Other techniques, such as message identifiers, may be used to determine if the client resides on a wireless network.

The receiver of the request determines if the requested object resides on another client in the wireless network 1002. For example, servers on the wireless network may keep service logs containing information about previous requests from other clients, particularly for objects that are frequently requested. A list of clients that received the requested object may be obtained from the service logs. In some aspects, specific clients may be designated as edge servers in the wireless network. Thus, information about which designated edge servers have the requested object may be obtained by the receiver of the request. Alternatively, the requesting client may determine if the requested object resides on another client in the network. A result of step 1002 is the identification of at least one source client on the wireless network that has the requested object or that can easily obtain the requested object.

The receiver of the request determines if the requesting client can be communicatively coupled to at least one of the source clients that have the requested object 1003. In one aspect, the receiver employs network topology maps of the wireless network to determine connectivity between the requesting client and the source client(s). In another aspect, the geographical location of the requesting client, such as GPS data provided by the requesting client, is used to select at least one nearby source client. Step 1003 may be employed as a means for filtering a source client set produced in Step 1002. In some aspects, the Step 1003 may be incorporated in Step 1002. In some aspects, the requesting client provides its relative network topology to the receiver so the receiver can determine if any nearby nodes have the requested object.

Once a source-client set is identified, the request is routed to at least one source client in the set 1004, and the source client sends the requested object to the requesting client. Step 1004 may comprise selecting an optimal source client, such as to maximize bit rates, conserve network resources (including client battery life), or optimize other performance metrics. In some aspects, the requested object may be served by a plurality of source clients. In some aspects of the invention, one or more of the steps 1001-1004 may be performed by the requesting client.

With respect to the WWAN configuration depicted in FIG. 5 and the flow diagrams in FIGS. 2 and 10, a network topology state is generated 201 comprising the WWAN client devices 500-505 and 510-513. In one aspect of the invention, the network topology state may include WLAN connections between the client devices 500-505 and 510-513. For example, connectivity information about the individual WLANs 531 and 532 may be included in the network topology state, as well as information that indicates that devices in one of the WLANs (e.g., WLAN 531) may communicate with devices in another of the WLANs (e.g., WLAN 532) without loading the WWAN. The network topology state may include devices within PANs, such as devices 551 and 552 in WPAN 533.

The network topology state may include information about connectivity to alternative networks. According to one aspect of the invention, the network topology state includes connectivity information about clients' 500 and 501 connections to access point 530. The network topology state may include connectivity information about the client 512 connection to access point 520 via PAN device 551.

Selecting edge server sets 202 may comprise selecting candidate edge servers that can relay content to WWAN clients while minimizing loads on the WWAN. In one aspect of the invention, WWAN clients 500, 501, 504, 505, and 512 may be selected as candidate edge servers for the set of clients 500-505 and 510-513. For example, clients 500, 501, and 512 may be selected because they can submit requests for content via other networks that do not load the WWAN. Client 500 may be selected because it is a network controller for the WLAN 531, so any content stored on the client 500 can easily be served to the other clients 501-505 in the WLAN 531. Clients 504 and 505 may be selected since they are WLAN clients in both of the WLANs 531 and 532. Thus, content stored on either client 504 and 505 can be made available to all the other clients in both WLANs 531 and 532.

In some aspects of the invention, selecting edge server sets 202 comprises determining which clients a candidate edge server can reach using peer-to-peer wireless links, such as communications paths spanning contiguous WLANs connecting the candidate edge server to the clients.

The performance metric for each edge server set 203 may be based on estimated loads on the WWAN and the WLANs 531 and 532, bandwidth and reliability of alternative networks, number of WWAN clients that can be served, latency, number of hops in peer-to-peer links, and the amount of data storage available on each set of edge servers. Calculating the performance metric 203 may comprise considering how requests for content can be routed in the network.

In one aspect of the invention, a WWAN client 502 informs the WLAN controller 500 that it wants to send a request for content via the WWAN. The WLAN controller 500 typically distributes data to the other WLAN clients 501-505 and controls how the WLAN clients 501-505 communicate via the WWAN. However, the WLAN controller 500 may process the request by redirecting it to another client in the WLAN 531 that functions as an edge server. For example, if the requested content already resides on client 504, the content may be served by client 504 directly to client 502, or via client 500 to the requesting client 502.

In one aspect of the invention, the request for content is intercepted by the WLAN controller 500 and forwarded to a virtual edge server, which is a client (such as client 500 or 501) having connectivity to a non-WWAN access point, such as access point 530. The requested content is received via the access point 530 and routed back to the requesting client 502 via the WLAN 531.

In some aspects of the invention, a request for content is transmitted via the WWAN. A WWAN controller, such as in the RNC 561, the SGSN 563, or the GGSN 564, may process the request to determine an alternate destination for serving the requested content. For example, the alternate destination may be one of the client nodes 500-505 and 510-513 selected as an edge server. The request may be forwarded to the alternative destination, or the address of the alternative destination may be returned to the requesting node.

In accordance with some aspects of the invention, a content-request interceptor resides in the WWAN infrastructure, such as on a client device functioning as a WLAN controller, in the RNC 561, the SGSN 563, or the GGSN 564. The content-request interceptor employs a network map that indicates paths to content resources, such as edge servers within the WWAN, as well as alternative routes to the Internet that reduce congestion on the WWAN. Such network maps may be employed for determining the network topology state 201, selecting candidate edge servers within the WWAN 202, and/or calculating the performance metrics 203. The edge server set having the best estimated performance is selected 204.

In one aspect of the invention, a backpressure routing algorithm is employed for calculating the performance metrics 203 for each candidate edge server set. Backpressure routing algorithms are well known for optimizing data flow in peer-to-peer networks. The performance of each edge server set may be calculated 203 based on how quickly a backpressure routing algorithm reduces queue backlogs. Alternatively, any combination of other performance metrics relating to network efficiency may be employed. Such backpressure routing algorithms may be employed for determining an edge server selection in a WWAN and/or the edge servers employed in a conventional CDN.

In one aspect of the invention, step 203 calculates the performance metric using a backpressure routing algorithm that makes decisions that generally minimize the sum of squares of queue backlogs in the network from one timeslot to the next. Data addressed to node C is denoted as commodity-C data and stored in a queue denoted as C-queue. In the following aspects, broadcast data may be addressed to multiple nodes, and while it may be stored in a single queue, for the purpose of backpressure algorithms, it may be regarded as residing in multiple queues. The queue backlog of commodity C is simply the amount of commodity-C data, which may be measured as the number of packets or number of bits. During each time slot, nodes can transmit data to each other. Data that is transmitted from one node to another node is removed from the queue of the first node and added to the queue of the second. Data that is transmitted to its destination is removed from the network.

According to one aspect of the invention, data transmissions for a predetermined number of time slots are simulated, and then the performance metric is based on the resulting reduction in queue backlogs. In another aspect of the invention, the number of time slots required to achieve a predetermined reduction in queue backlogs is estimated, and that number of time slots is employed in the performance metric.

In the backpressure routing algorithm, a transmission rate matrix has values $\mu_{ab}(t)$ indicating the transmission rate used by the network over link (a,b) in time slot t, representing the amount of data it can transfer from node a to node b in the current slot. This can be time-varying due to time-varying channels and node mobility. There are multiple transmission matrices $\mu_{ab}(t)$ that can be used, since it's typically not possible for all the nodes to transmit and receive simultaneously in a given time slot, such as may be due to limited channel resources and multiple-access interference.

Let S(t) represent the topology state of the network, which captures properties of the network on slot t that affect transmission. Let $\Gamma_{S(t)}$ represent the set of transmission rate matrix options available under topology state S(t). In each time slot t, the network controller observes S(t) and chooses transmission rates ($\mu_{ab}(t)$) within the set $\Gamma_{S(t)}$.

In conventional backpressure routing, each node a observes its own queue backlogs and the backlogs in its current neighbors. A current neighbor of node a is a node b such that it is possible to choose a non-zero transmission rate $\mu_{ab}(t)$ on the current slot. It is typical for the number of neighbors to be much less than the total number of nodes in the network. The set of neighbors of a given node determine the set of outgoing links it can possibly use for transmission on the current slot.

Typically, the optimal commodity is chosen for transmission between two nodes, wherein the optimal commodity is the commodity that has the maximum differential backlog between node a and node b. For example, for outgoing link (a,b), a large backlog in node a and a small backlog in node b constitutes a large differential backlog between a and b. A weight $W_{ab}(t)$ for each link is computed that represents the differential backlog. For example, $W_{ab}(t)$ may be proportional to the differential backlog. Next, the best transmission matrix for the optimal commodity is chosen such that the product of the weight matrix and the transmission matrix is maximized. Routing variable for each transmission link are selected based on the selected transmission rates ($\mu_{ab}(t)$). The total of the final weights $W_{ab}(t)$ may be employed in the performance metric calculation 203.

In one aspect of the invention, commodity data backlogs are based on statistical models, such as may be determined from client-device information, such as the type and amount of data each device is capable of receiving, storage capacity, etc. Statistical models may comprise historical data, such as historical network loads, historical distributions of nodes in a wireless network, historical channel data (such as channel models), etc. In another aspect of the invention, commodity data backlogs are based on current or near-current backlogs reported by each node.

In one aspect of the invention, each node determines its own set of transmission rates and routing variables. For example, in a wireless network, nodes typically communicate via pilot signals, control signals, and/or training sequences from which link-quality information can be determined. Signal strength, signal-to-interference levels, bit-error rate, and/or other signal quality metrics may be measured by each node for determining its transmission rates and routing variables. Similarly, nodes may report link-quality information to a network controller, such as an access point or a cellular base station. Such link-quality information may comprise direct link-quality information, such as a requested data rate, or it may comprise indirect link-quality information, such as a power-control requests and/or acknowledgments.

Figure 8:
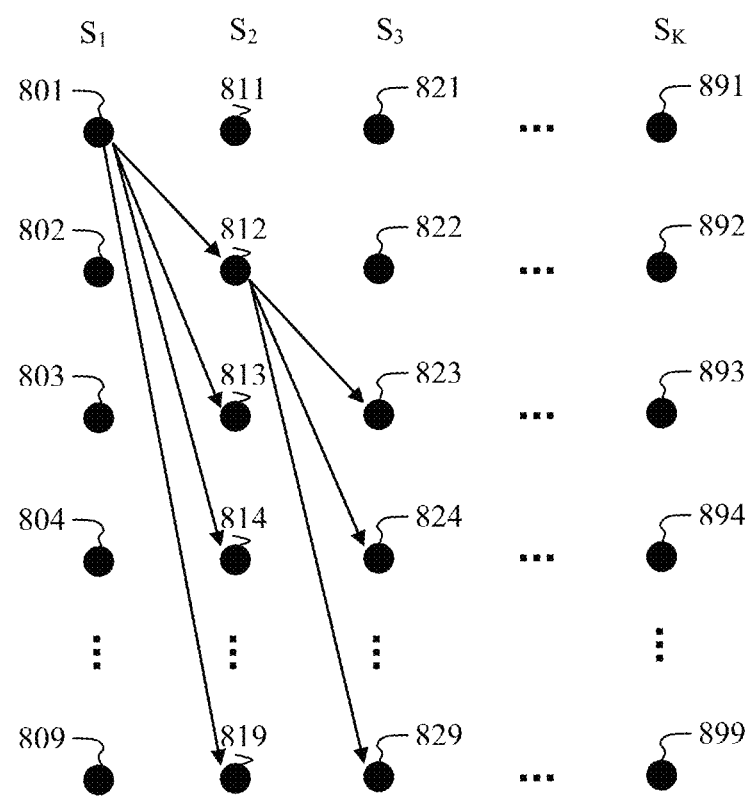
FIG. 8 depicts a state transition diagram according to one aspect of the invention that employs a recursive solution to the problem of estimating the state sequence of a discrete-time finite-state Markov process.

In one aspect of the invention, node links and their respective transmission rates are reported to a central processor, which employs commodity data backlogs for calculating weight matrices and selecting optimal commodities and transmission matrices. A set of candidate edge servers is selected. For example, the set of candidate edge servers may comprise a set of pre-selected edge servers plus a candidate edge server selected from a set of edge servers, such as denoted in a state of a state-transition (i.e., trellis) diagram shown in FIG. 8.

In the trellis diagram, each node corresponds to a distinct state at a given time, and each arrow represents a transition to some new state at the next instant of time. For example, each node 801-809 represents a set of candidate edge servers corresponding to a first calculation interval $S_1$. Each node 811-819 represents a set of candidate edge servers corresponding to a second calculation interval $S_2$. Each node 821-829 represents a set of candidate edge servers at a third calculation interval $S_3$, and each node 891-899 represents a set of candidate edge servers at a $K^{th}$ calculation interval $S_K$.

Each arrow represents a state transition from a first edge server set in a first (e.g., $k^{th}$) state (e.g., state $S_k$) to a second edge server set in the next $(k+1)^{th}$ state (e.g., state $S_{k+1}$). By way of example, but without limitation, the second edge server set may differ from the first edge server set by one edge server. In one aspect of the invention, the second edge server set is produced by appending one edge server to the first edge server set. In another aspect of the invention, the second edge server set is produced by removing one of the edge servers in the first edge server set. In yet another aspect of the invention, the second edge server set is produced by replacing one of the edge servers in the first set.

The possible state transitions depend on the rules differentiating one state from the next, and the set of available edge servers when a state transition comprises appending or replacing an edge server. The possible state transitions may be further restricted, such as to discard identical sets.

In one aspect of the invention, nodes 801, 811, 821 ... 891 correspond to appending a first edge server to the set. Nodes 802, 812, 822 ... 892 correspond to appending a second edge server to the set. Nodes 803, 813, 823 ... 893 correspond to appending a third edge server to the set. Nodes 804, 814, 824 ... 894 correspond to appending a fourth edge server to the set. Nodes 809, 819, 829 ... 899 correspond to appending an $N^{th}$ edge server to the set. Considering node 801 in the first state $S_1$, there is only one possible edge server set, which is the set comprising the first edge server. Similarly, node 802 comprises the second edge server set, and so on. The possible state transitions from node 801 comprise appending the second edge server (node 812), the third edge server (node 813), the fourth edge server (node 814), ... and the $N^{th}$ edge server (node 819). There is no state transition from node 801 to node 811, since the first edge server is already part of the set.

For each state transition, there is a branch metric. In accordance with aspects of the invention, the performance metric indicates any improvement in network performance minus any costs resulting from the state transition (i.e., the corresponding change in the set of candidate edge servers). This performance metric may be used as a current branch metric for a state transition. When a new edge server is appended to an edge server set, this typically changes the set of clients served by each edge server, which changes network loads, congestion, and network efficiency. There is also an additional cost associated with appending and edge server.

There are multiple state transitions that connect to node 812. For example, in addition to the state transition from node 801, state transitions from nodes 803-809 connect to node 812. In accordance with one aspect of the invention, accumulated branch metrics for all the state transitions to node 812 are compared, and the branch corresponding to the highest accumulated branch metric is retained. Thus, each node may comprise a single branch from the previous state. An accumulated branch metric is computed by adding a previous accumulated branch metric to a current branch metric. Since the state transition 802 to 811 produces the same set as the state transition 801 to 812, one of these branches can be discarded.

If the state transition from node 801 has the highest accumulated branch metric at node 812, then the next possible state transitions comprise nodes 823-829. This appending procedure ends when a predetermined criterion is met, such as when a predetermined number of edge servers is reached or when the cost of adding an edge server exceeds the benefit. At this point, the best edge server set (i.e., the best path) is selected. Once the best edge server set is selected, the set is forwarded to the network (e.g., the CDN and/or the WWAN) for assigning edge server functions to the selected nodes.

The algorithm may be repeated and/or modified in an update mode. For example, an update mode may comprise updating the network topology state. Based on changing demand or other variations in the network topology state, the update mode may comprise determining how much appending an edge server, removing an edge server, and/or replacing an edge server would improves the network's performance metric. Specifically, the best edge server set may be continuously re-evaluated, and it may be updated when certain criteria are met.

Figure 9:
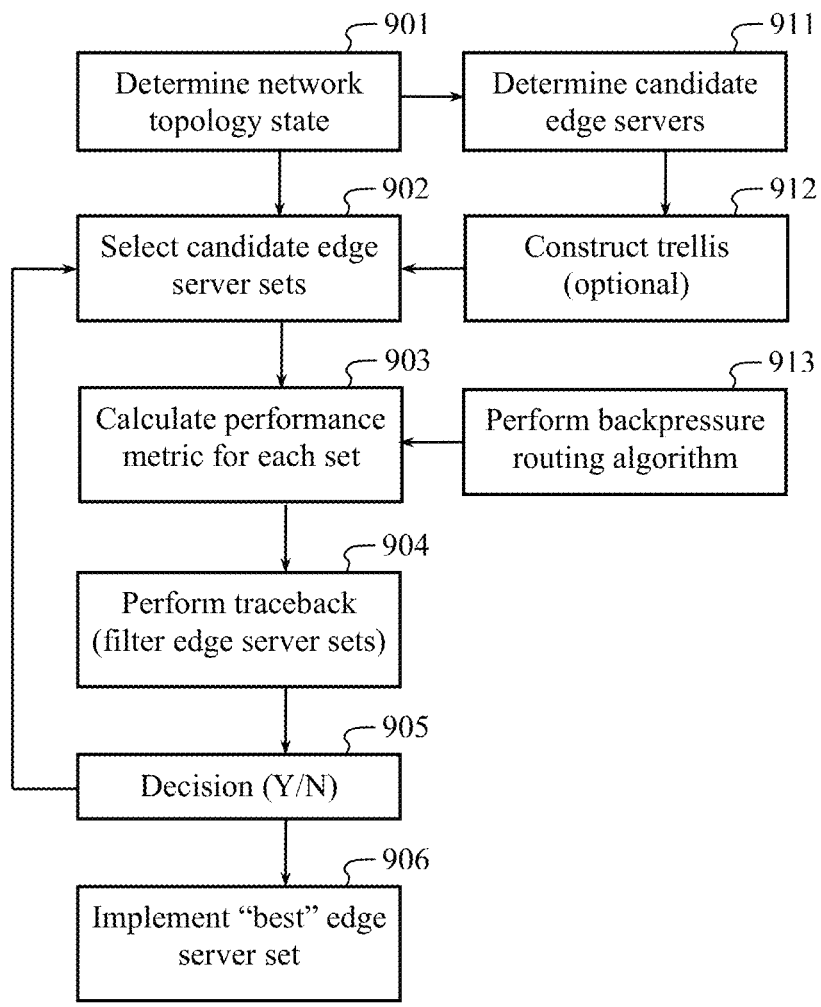
FIG. 9 is a flow diagram illustrating a method for selecting edge servers in accordance with an aspect of the invention.

FIG. 9 is a flow diagram illustrating a method for selecting edge servers in accordance with an aspect of the invention. A first step 901 comprises determining a network topology state for the network. For example, the network topology state may comprise a map of communication links between the node and some performance measurement, such as bit rate, indicating the quality of each link. The network topology state may include congestion information, such as queue backlogs in each node, which may be used for performing a backpressure routing algorithm 913.

Step 911 comprises determining available edge servers. Typically, information about the nodes is used to determine available edge servers. For example, a CDN service provider may provide a list of nodes available to perform content storage services. In a WWAN, storage space on the nodes and each node's access to content delivery resources (such as alternative networks) may be used to determine which nodes are available to perform edge server functions. Available edge servers may optionally be determined from the network topology state. For example, network congestion, outages, latency, and link reliability may be employed for determining candidate edge servers 911. Optionally, a trellis may be constructed that depicts possible edge server combinations (i.e., edge server sets) as a state-transition diagram.

In step 902, one of a plurality of candidate edge server sets is selected 902 for evaluation. A performance metric is calculated 903 for each set. For the selected set of candidate edge servers, a routing algorithm may be employed (such as a backpressure routing algorithm 913) from which the performance metric is calculated 903.

The performance metric may comprise an expression of the overall efficacy of routing data to all the nodes in the network, or at least a subset of the nodes. For example, calculation of the performance metric 903 may comprise a measure of latency in delivering data to the nodes, the distribution of network loads, bottlenecks, as well as other factors that affect bandwidth efficiency and/or the timely delivery of data to the nodes. In some aspects, the performance metric comprises a cost associated with an edge server selection. For example, there may be a monetary cost associated with using each edge server, and this cost may be balanced with improvements in network efficiency. In such cases, a monetary benefit may be attributed to each improvement in network efficiency. Thus, aspects of the invention may comprise integrating business decisions with technical decisions.

The performance metric may correspond to the branch metric for a given state transition, such as depicted in a state-transition diagram. Thus, step 903 may comprise calculating accumulated branch metrics for each state, and the optimal incoming path associated with each state may be determined. A step of performing traceback 904 uses this information to determine an optimal path through the trellis for updating the best edge server set.

A decision step 905 determines whether or not to output the best edge server set to the network so that it may be implemented. The decision step 905 may also decide whether to continue evaluating candidate edge server sets. In one aspect of the invention, the decision step 905 compares the best edge server set for a current state to the best edge server set determined in a previous state. If the best edge server set in the current state has a better performance value compared to the previously selected best edge server set, control may be returned to step 902, wherein candidate edge server sets corresponding to the next state are selected 902. Alternatively, if the best edge server set from the previous state is better than the best edge server set of the current state, then the previous edge server set is deemed to be the best set and is employed in further decision processing in step 905.

The decision step 905 may compare the best candidate edge server set to the edge server set employed by the network. If the performance of the best set exceeds the performance of the employed set by a predetermined margin, the best set may be forwarded to the network for implementation 906.

In accordance with one aspect of the invention, selecting candidate edge server sets 902 begins with a state transition that starts at a node representing the edge server set currently employed by the network.

In accordance with another aspect of the invention, the method depicted in FIG. 9 may be employed in an update mode wherein at least step 902 is restarted each time the network topology state is updated 901.

For clarity of explanation, the illustrative system and method aspects is presented as comprising individual functional blocks. The functions these blocks represent may be provided through the use of either shared or dedicated hardware, including, but not limited to, hardware capable of executing software. For example the functions of one or more blocks may be provided by a single shared processor or multiple processors. Use of the term "processor" should not be construed to refer exclusively to hardware capable of executing software. Illustrative aspects may comprise microprocessor and/or digital signal processor (DSP) hardware, read-only memory (ROM) for storing software performing the operations discussed below, and random access memory (RAM) for storing results. Very large scale integration (VLSI), field-programmable gate array (FPGA), and application specific integrated circuit (ASIC) hardware aspects may also be provided.

The methods and systems described herein merely illustrate particular aspects of the invention. It should be appreciated that those skilled in the art will be able to devise various arrangements, which, although not explicitly described or shown herein, embody the principles of the invention and are included within its scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method for device-to-device communications in a cellular network, the method comprising:
configuring one or more processors to receive wireless network topology information from each of a plurality of wireless user devices, the wireless network topology information comprising which other ones of the plurality of wireless user devices are within radio communication range of the each of the plurality of wireless user devices;
configuring the one or more processors to receive a request for content from a first wireless user device;
configuring the one or more processors to use the wireless network topology information for selecting a second wireless user device that has the content and is within radio communication range of the first wireless user device; and
configuring the one or more processors to transmit a radio resource allocation to the first wireless user device that is used by the first wireless device to create a peer-to-peer link with the second wireless user device.

2. The method of claim 1, wherein the peer-to-peer link comprises a single-hop link, a multi-hop link, or a Multiple Input Multiple Output (MIMO) link.

3. The method of claim 1, wherein the second wireless user device is a content source, a relay, or a node in a cooperative cluster of nodes.

4. The method of claim 1, wherein each of the plurality of wireless user devices listens to transmissions from the other wireless user devices to determine which of the other wireless user devices are within radio communication range.

5. The method of claim 1, wherein the wireless network topology information comprises at least one of link quality information, link bandwidth, link reliability, latency, congestion, demand topology, queue backlogs, bit rates, bit error rates, packet error rates, signal-to-noise ratio, channel estimates, power control messages, acknowledgements, geographical distributions of users, identification information for each of the plurality of wireless user devices, and information about at least one wireless user device's connectivity to at least one other network.

6. The method of claim 1, wherein the one or more processors comprises a base station, an access point, a base transceiver station, a nodeB, an edge server, a parent server, an origin server, or a wireless network controller.

7. A method for device-to-device communications in a cellular network, the method comprising:
configuring one or more processors to receive wireless network topology information from each of a plurality of wireless user devices, the wireless network topology information comprising which other ones of the plurality of wireless user devices are within radio communication range of the each of the plurality of wireless user devices;
configuring the one or more processors to receive a request for content from a first wireless user device;
configuring the one or more processors to use the wireless network topology information for selecting a second wireless user device that has the content and is within radio communication range of the first wireless user device; and
configuring the one or more processors to forward the request to the second wireless user device.

8. The method of claim 7, further comprising configuring the one or more processors to transmit a radio resource allocation to at least one of the first wireless user device and the second wireless user device to create a peer-to-peer link connecting the first wireless user device with the second wireless user device.

9. The method of claim 7, wherein the peer-to-peer link comprises a single-hop link, a multi-hop link, or a Multiple Input Multiple Output (MIMO) link.

10. The method of claim 7, wherein the second wireless user device is a content source, a relay, or a node in a cooperative cluster of nodes.

11. The method of claim 7, wherein each of the plurality of wireless user devices listens to transmissions from the other wireless user devices to determine which of the other wireless user devices are within radio communication range.

12. The method of claim 7, wherein the wireless network topology information comprises at least one of link quality information, link bandwidth, link reliability, latency, congestion, demand topology, queue backlogs, bit rates, bit error rates, packet error rates, signal-to-noise ratio, channel estimates, power control messages, acknowledgements, geographical distributions of users, identification information for each of the plurality of wireless user devices, and information about at least one wireless user device's connectivity to at least one other network.

13. The method of claim 7, wherein the one or more processors comprises a base station, an access point, a base transceiver station, a nodeB, an edge server, a parent server, an origin server, or a wireless network controller.

14. A method for device-to-device communications in a cellular network, the method comprising:
configuring one or more processors to receive wireless network topology information from each of a plurality of wireless user devices, the wireless network topology information comprising which other ones of the plurality of wireless user devices are within radio communication range of the each of the plurality of wireless user devices;
configuring the one or more processors to receive a request for content from a first wireless user device;
configuring the one or more processors to use the wireless network topology information for selecting a second wireless user device that has the content and is within radio communication range of the first wireless user device; and
configuring the one or more processors to send a resource identifier to the first wireless user device that identifies the second wireless user device.

15. The method of claim 14, further comprising configuring the one or more processors to transmit a radio resource allocation to at least one of the first wireless user device and the second wireless user device to create a peer-to-peer link connecting the first wireless user device with the second wireless user device.

16. The method of claim 14, wherein the peer-to-peer link comprises a single-hop link, a multi-hop link, or a Multiple Input Multiple Output (MIMO) link.

17. The method of claim 14, wherein the second wireless user device is a content source, a relay, or a node in a cooperative cluster of nodes.

18. The method of claim 14, wherein each of the plurality of wireless user devices listens to transmissions from the other wireless user devices to determine which of the other wireless user devices are within radio communication range.

19. The method of claim 14, wherein the wireless network topology information comprises at least one of link quality information, link bandwidth, link reliability, latency, congestion, demand topology, queue backlogs, bit rates, bit error rates, packet error rates, signal-to-noise ratio, channel estimates, power control messages, acknowledgements, geographical distributions of users, identification information for each of the plurality of wireless user devices, and information about at least one wireless user device's connectivity to at least one other network.

20. The method of claim 14, wherein the one or more processors comprises a base station, an access point, a base transceiver station, a nodeB, an edge server, a parent server, an origin server, or a wireless network controller.

* * * * *